(12) United States Patent
Aiso

(10) Patent No.: US 8,923,533 B2
(45) Date of Patent: Dec. 30, 2014

(54) CONTROL DATA GENERATION DEVICE AND METHOD

(75) Inventor: Masaru Aiso, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1233 days.

(21) Appl. No.: 12/536,716

(22) Filed: Aug. 6, 2009

(65) Prior Publication Data

US 2010/0034400 A1 Feb. 11, 2010

(30) Foreign Application Priority Data

Aug. 6, 2008 (JP) .................................. 2008-202922

(51) Int. Cl.
| | |
|---|---|
| *H04B 1/00* | (2006.01) |
| *G11B 27/34* | (2006.01) |
| *G11B 27/038* | (2006.01) |
| *G11B 27/031* | (2006.01) |
| *G06F 3/0362* | (2013.01) |
| *H04H 60/04* | (2008.01) |

(52) U.S. Cl.
CPC .............. *G11B 27/031* (2013.01); *G11B 27/34* (2013.01); *G11B 27/038* (2013.01); *G06F 3/0362* (2013.01); *H04H 60/04* (2013.01)
USPC ................................ 381/119; 381/109; 369/3

(58) Field of Classification Search
USPC ......... 381/58, 119, 104–109; 700/94; 84/625, 84/660; 318/445, 466, 2
See application file for complete search history.

(56) References Cited

U.S. PATENT DOCUMENTS

| | | | | | |
|---|---|---|---|---|---|
| 5,054,077 | A | * | 10/1991 | Suzuki ......................... | 381/109 |
| 5,060,272 | A | * | 10/1991 | Suzuki ......................... | 381/119 |
| 5,243,513 | A | * | 9/1993 | Peters .............................. | 700/83 |
| 5,623,551 | A | * | 4/1997 | East et al. ..................... | 381/119 |
| 5,805,146 | A | * | 9/1998 | Jaeger et al. .................. | 345/172 |
| 6,967,452 | B2 | * | 11/2005 | Aiso et al. ..................... | 318/466 |
| 7,319,765 | B2 | * | 1/2008 | Suyama et al. ............... | 381/119 |
| 7,450,728 | B2 | * | 11/2008 | Aiso et al. ..................... | 381/119 |

(Continued)

FOREIGN PATENT DOCUMENTS

| | | |
|---|---|---|
| DE | 44 38 793 A1 | 5/1996 |
| JP | 2684808 | 11/1991 |
| JP | 09-307376 A | 11/1997 |
| JP | 2004-178395 | 6/2004 |

OTHER PUBLICATIONS

European Search Report mailed Nov. 4, 2009, for EP Application No. 09167338.4, eight pages.

*Primary Examiner* — Xu Mei
(74) *Attorney, Agent, or Firm* — Morrison & Foerster LLP

(57) ABSTRACT

Control data is generated in response to generation, from a position detector, of position data in accordance with a predetermined scale characteristic. Change scale characteristic is applied in manual operation performed immediately after an operation member has been automatically positioned to a target position. In the change scale characteristic, a start point is established such that control data, corresponding to the target position, of the predetermined scale characteristic is outputted in correspondence with the position data outputted at the time of completion of the positioning, but also a first change portion, including a portion extending from a position of the start point at least up to the target position, is established, so that the control data outputted in correspondence with the position data output gradually varies from data corresponding to the start point to data of the predetermined scale characteristic corresponding to an end point of the first change portion.

13 Claims, 7 Drawing Sheets

(56) References Cited

U.S. PATENT DOCUMENTS

| | | | |
|---|---|---|---|
| 7,539,317 B2 * | 5/2009 | Aiso et al. | 381/104 |
| 7,936,889 B2 * | 5/2011 | Aiso et al. | 381/119 |
| 2004/0104703 A1 | 6/2004 | Aiso et al. | |
| 2008/0078283 A1 * | 4/2008 | Kato et al. | 84/625 |

* cited by examiner

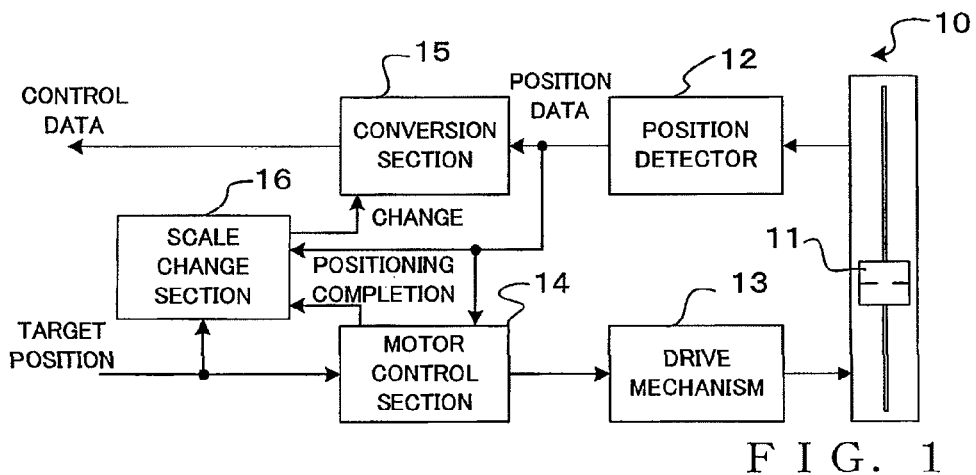
F I G. 1
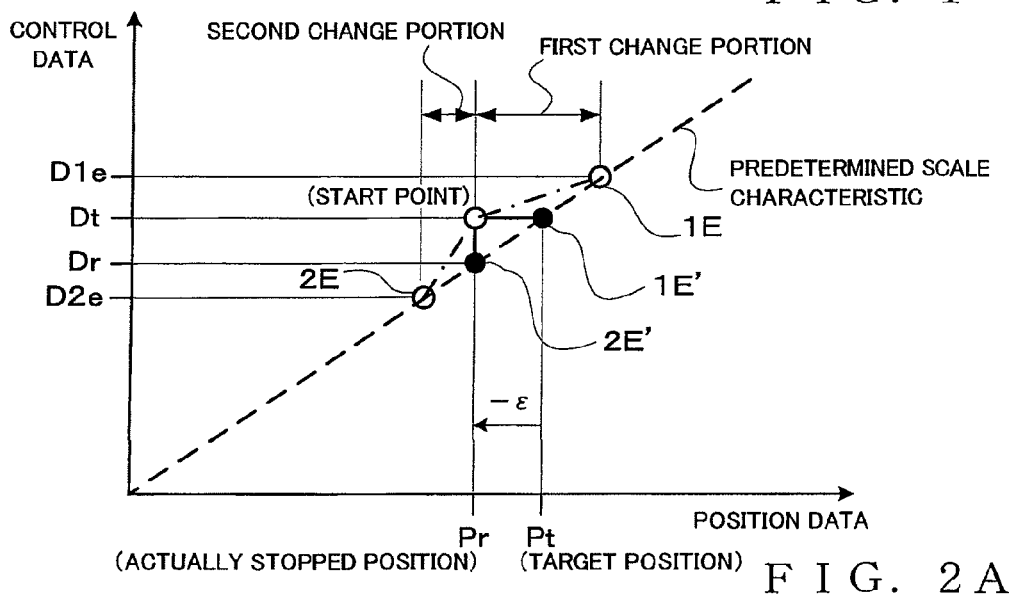
F I G. 2A
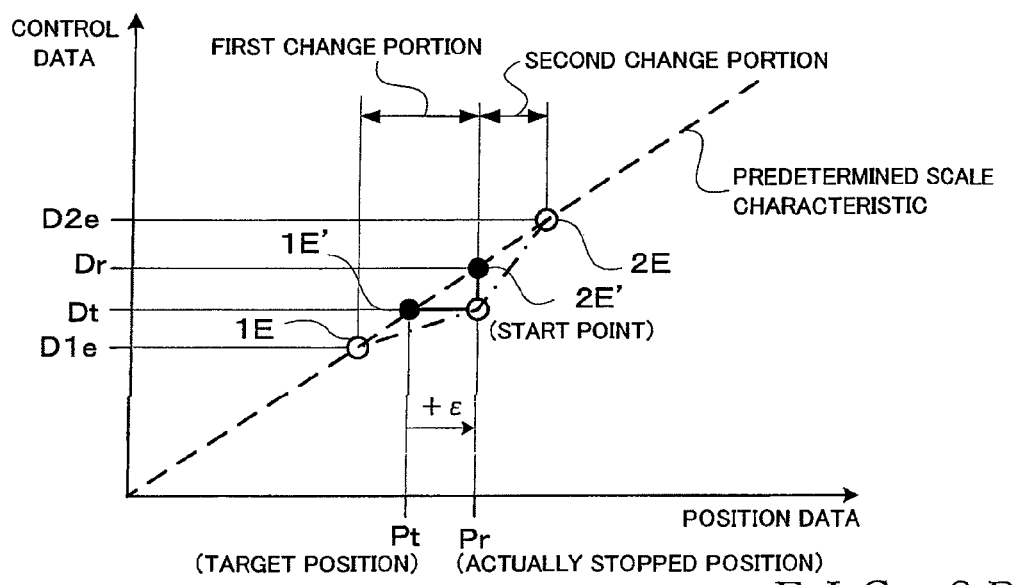
F I G. 2B

CONTROL DATA GENERATION DEVICE AND METHOD

BACKGROUND

The present invention relates to control data generation devices which detect an operating position of an operation member, employed in an audio mixer apparatus or control equipment and capable of both manual operation and automatic operation, to generate control data corresponding to the detected operating position, and more particularly to a control data generation device which can generate control data, causing no odd feeling, by effectively eliminating a positioning error, produced at the time of automatic operation of an operation member, in response to manual operation of the operation member performed immediately after the automatic operation.

In audio mixer apparatus, there are provided faders (sliding-type operation members) manually operable by a human operator for adjusting/setting levels, frequency characteristics, etc. of audio signals to be mixed or audio signals to be output. Among various types of faders is one constructed as an electric fader capable of both manual operation and automatic operation, and examples of such electric faders are disclosed in Japanese Patent No. 2684808 and Japanese Patent Application Laid-open Publication No. 2004-178395.

In view of the facts that there is considerable variation (or discrepancy) in position-vs.-output characteristic among position sensors attached to individual faders (i.e., sensor-specific errors) and there are also installation errors of the position sensors relative to fader structures (variation in installation error among the faders), the No. 2004-178395 publication discloses performing calibration of the position detection data for each of the faders to standardize between index positions (operating positions) of the faders and position detection data of the position sensors attached to the faders, in order to eliminate or absorb the above-mentioned errors or variation. With such an arrangement, every fader can be standardized in such a manner that position detection data of a same value can be generated as position detection data corresponding to a same index position (operating position).

Further, in order to address the problem of the traditional technique that, when a fader is to be automatically positioned at a desired position, there would occur a difference between actual position detection data provided from a position sensor in correspondence with an index position ( ) corresponding to the target position and data given as the target position (i.e., target position data) due to the above-mentioned sensor-specific errors, installation errors, etc., the No. 2004-178395 publication discloses a technique of converting the target position data in such a manner that it indicates an actual position detection data value corresponding to an index position that corresponds to the target position data. By positioning the fader in accordance with the thus-converted target position data, the disclosed technique can achieve automatic fader positioning with the above-mentioned sensor-specific errors and installation errors appropriately compensated for.

Further, in general, a difference exists between inherent positioning precision of an automatic positioning mechanism that automatically positions a fader through driving of a motor and inherent position detecting precision of a position sensor. Particularly, in recent years, an encoder is employed as the position sensor to increase the position detecting precision of the sensor, and thus, the positioning precision of the automatic positioning mechanism tends to be coarser or lower than the position detecting precision of the position sensor. In the case where the position detecting precision of the position sensor is finer or higher than that of the automatic positioning mechanism, the following problems would arise. Namely, even when the automatic positioning mechanism has positioned a fader accurately relative to a target position within its positioning precision, it would be detected that the fader has been positioned slightly deviated from the target position in terms of the positioning precision level of the automatic positioning mechanism. In such a case, when the fader is manually operated immediately after automatically positioned, a value slightly deviated from the target position that is an original initial value would be undesirably output as an initial value of fader operating position detection data in response to the manual operation. If, for example, the automatic positioning mechanism has positioned a fader at a position of −9.98 dB with an error of 0.02 dB from a target position of −10 dB, then the position sensor may accurately detect the position of the fader containing such an error to thereby output position detection data of −9.98 dB. In such a case, if a human operator moves the fader from the automatically positioned target position of −10 dB toward a −11 dB position, then the actual fader output value will change from the −9.98 dB position through the −10 dB position toward the −11 dB position. Namely, although the initial value of the manual operation should be the target position value −10 dB, the actual fader output value would start at −9.98 dB that is different from −10 dB. In this case, predetermined control, such as level adjustment, would be undesirably performed on an audio signal on the basis of such position detection data in a slightly inaccurate manner. Thus, for example, the human operator would be given an odd feeling.

Thus, the aforementioned prior art technique can not drastically solve the error problem arising from the inherent positioning precision of the automatic positioning mechanism. In order to avoid the problem, there is no other way but to set the position detecting precision of the position sensor to be coarser or lower than the positioning precision of the automatic positioning mechanism. However, if the position detecting precision of the position sensor is so set, an operating position of the operation member can be detected only with a coarse or low resolution even though the position sensor of a high resolution is employed, which presents the problem that effective and efficient utilization of the resource can not be achieved.

SUMMARY OF THE INVENTION

In view of the foregoing, it is an object of the present invention to provide an improved control data generation device and method which can generate appropriate control data, causing no odd feeling, by effectively eliminating a positioning error, produced at the time of automatic operation of the operation member, in response to manual operation of the operation member performed immediately after the automatic operation and thereby permits effective and efficient utilization of the position sensor having a high resolution.

In order to accomplish the above-mentioned object, the present invention provides an improved control data generation device, which comprises: an operation member operable over a predetermined movement range; a position detector section that detects a current operating position of the operation member in the predetermined movement range and outputs position data corresponding to the detected current operating position; a conversion section that converts the position data, outputted by the position detector section, into control data in accordance with a predetermined scale characteristic; an automatic positioning section that positions the operation member to an instructed target position, positioning precision of the automatic positioning section being lower than position detecting precision of the position detector section so that positioning, to the target position, of the operation member is performed within a predetermined error range relative to the position detecting precision of the position detector section; and a scale change control section that applies a change scale characteristic at a time of completion of the positioning by the automatic positioning section and changes a value of the control data, outputted by the conversion section, in accordance with the applied change scale characteristic. In the change scale characteristic, not only a start point is established such that control data, corresponding to the target position, of the predetermined scale characteristic is outputted in correspondence with the position data outputted by the position detector section at the time of completion of the positioning, but also a first change portion, including a portion extending from a position of the start point at least up to the target position, is established. Further, during application of the change scale characteristic, the scale change control section changes the control data in such a manner that a value of the control data outputted by the conversion section in correspondence with the position data in the first change portion gradually varies, in accordance with a first change scale, from a value of the control data corresponding to the start point to a value of the control data of the predetermined scale characteristic corresponding to an end point of the first change portion. The application of the change scale characteristic is canceled once the operating position of the operation member reaches the end point of the first change portion.

According to the present invention, the scale change control section applies the change scale characteristic at the time of completion of the positioning by the automatic positioning section, and the change scale characteristic applied is characterized as set forth above. Further, a start point is established such that control data, corresponding to the target position, of the predetermined scale characteristic is outputted in correspondence with the position data outputted by the position detector section at the time of completion of the positioning. Thus, even if the result of the positioning by the automatic positioning section has some error in terms of the position detecting precision of the position detector section, the control data corresponding to positioned data output from the position detector at the time of completion of the automatic positioning is changed to control data, corresponding to the target position, of the predetermined scale characteristic, so that the control data can be processed as if it had apparently no error. Thus, if the operation member has been manually operated after the automatic positioning, an initial value of control data corresponding to position data output from the position detector section in response to the manual operation necessarily agrees with a value corresponding to the target position (i.e., original initial value), so that the control data generation device of the present invention can generate control data causing no odd feeling and inconvenience. Further, in the change scale characteristic, the first change portion, including a portion extending from a position of the start point at least up to the target position, is established, so that, during application of the change scale characteristic, the scale change control section changes the control data in such a manner that the value of the control data outputted by the conversion section in correspondence with the position data gradually varies, in accordance with the first change scale, from the value of the control data corresponding to the start point to the value of the control data of the predetermined scale characteristic corresponding to the end point of the first change portion. Thus, the end point of the first change portion is set at the target position or at a position located beyond the target position, so that, as the operation member having previously been stopped at a position deviated from the target position is moved toward the target position, appropriate control data causing no odd feeling can be generated without the control data, having at the start point a value corresponding to the target position, undesirably running counter to a human operator's intention (e.g., changing to decrease in value although the human operator has performed operation for increasing the value) at all (or even temporarily). Also, it is possible to achieve a smooth shift from the change scale characteristic to the predetermined scale characteristic. Further, even where the positioning precision of the automatic positioning section is coarser or lower than the position detecting precision of the position detector section, the present invention can generate non-problematic, appropriate control data and thereby permits effective and efficient utilization of the position detector section having a high resolution.

Preferably, in the change scale characteristic, a second change portion is also established, on an opposite side from the first change portion with respect the position of the start point, so as to extend from the position of the start point in an opposite direction from the first section. During application of the change scale characteristic, the scale change control section changes the control data in such a manner that the value of the control data outputted by the conversion section in correspondence with the position data in the second change portion gradually varies, in accordance with a second change scale, from the value of the control data corresponding to the start point to a value of the control data of the predetermined scale characteristic corresponding to an end point of the second change portion. The application of the change scale characteristic is canceled once the operating position of the operation member reaches the end point of the second change portion. Thus, even where the operation member having previously been stopped at a position deviated from the target position is moved in an opposite direction from the target position, it is possible to achieve a smooth shift from the change scale characteristic to the predetermined scale characteristic. In this case, because the operation member is moved in the opposite direction from the target position, the control data, having at the start point a value corresponding to the target position, never runs counter to a human operator's intention, and thus, there occurs no problem of control data running counter to a human operator's intention even where the second change portion is not set. However, in order to achieve a smooth shift from the change scale characteristic to the predetermined scale characteristic, it is more advantageous to substantively set the second change section.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a block diagram showing a general setup of an electric fader that is an embodiment of a control data generation device of the present invention;

FIGS. 2A and 2B are graphs showing an example of a predetermined scale characteristic of a conversion section and an example of a change scale characteristic;

DETAILED DESCRIPTION

Figure 3:
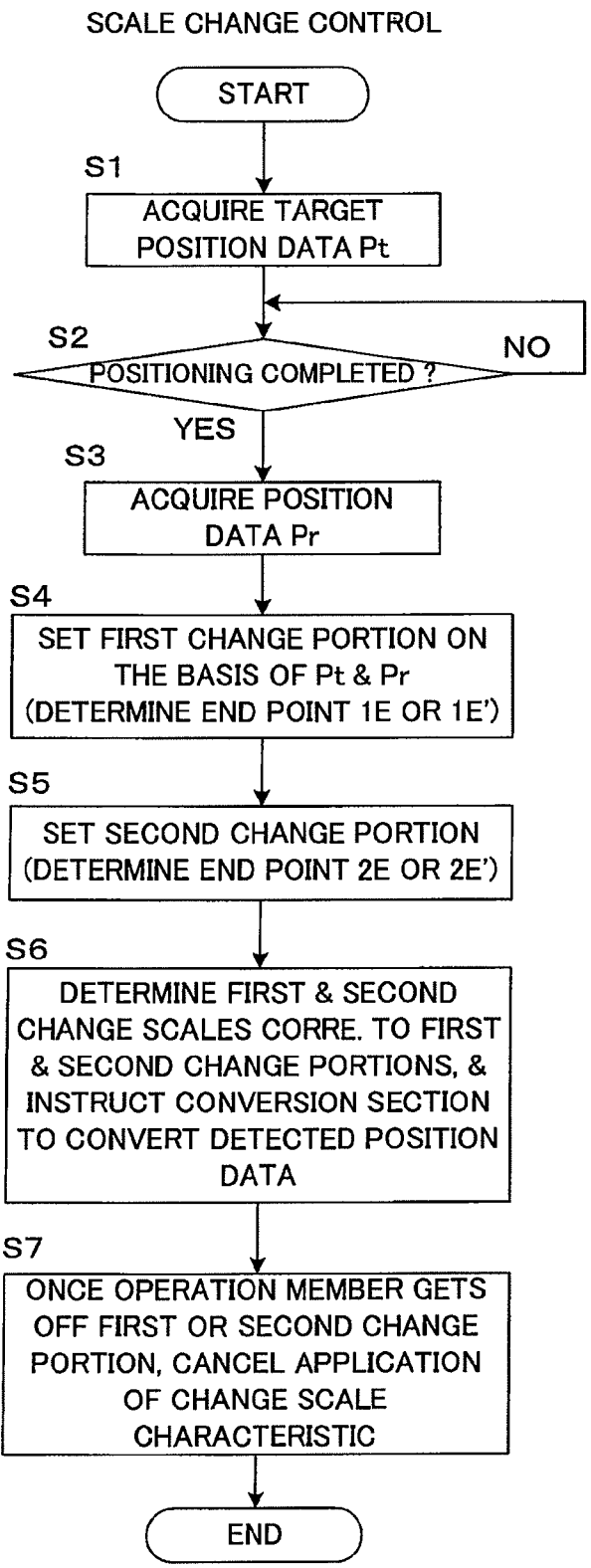
FIG. 3 is a flow chart showing a basic concept of control performed by a scale change control section of FIG. 1.

FIG. 1 is a block diagram showing a general setup of an electric fader 10 that is an embodiment of a control data generation device of the present invention. The electric fader 10 includes a sliding knob (i.e., operation member) 11 operable over a predetermined linear movement range, and the sliding knob 11 is capable of both manual operation and automatic operation. Position detector 12 detects a current operating position of the sliding knob 11 in the predetermined linear movement range and outputs position data, corresponding to the detected current operating position, in a digital value. The position detector 12 may be of any conventionally-known type, such as one comprising a combination of a variable resistor and an analog/digital converter, a magnetic linear encoder, an optical linear encoder or a linear resolver. Drive mechanism 13 includes an electric motor for automatically moving the sliding knob 11 and a mechanism for transmitting the driving force of the motor to the sliding knob 11 as a linear moving force. Note that the motor employed here may be either a rotary motor or a linear motor. Motor control section 14 controls the motor of the drive mechanism 13 for automatically moving (positioning) the knob 11 to a designated target position. More specifically, as conventionally known in the art, the motor control section 14 receives or inputs the position data, output from the position detector 12, as feedback information and performs feedback control (or servo control) so as to position the knob 11 to a target position. The drive mechanism 13 and the motor control section 14 together constitute an automatic positioning section for positioning the knob (operation member) 11 to a target position.

In the instant embodiment, the drive mechanism 13 has positioning precision coarser or lower than the position detecting precision of the position detector 12, so that positioning to a target position is performed within a predetermined error range relative to the position detecting precision of the position detector 12. For example, whereas the position detecting precision (resolution) of the position detector 12 is 0.1 mm, the positioning precision of the drive mechanism 13 is ±0.5 mm. In this case, the error range of the positioning to a target position relative to the position detecting precision of the position detector 12 is ±5 points (one point here indicates a minimum unit of the position detection by the position detector 12).

Conversion section 15 converts position data output from the position detector 12 into control data in accordance with a predetermined scale characteristic. The predetermined scale characteristic employed here may be a desired scale characteristic corresponding to an application of the control data generation device (electric fader 10) of the present invention. For example, the conversion section 15 may convert the position data, output from the position detector 12, in accordance with a linear characteristic, to thereby generate control data of a linear characteristic relative to the operating position of the knob 11. Alternatively, the conversion section 15 may convert the position data, output from the position detector 12, in accordance with a logarithmic characteristic, to thereby generate control data of a logarithmic characteristic (i.e., decibel data) relative to the operating position of the knob 11.

Once a "positioning completion" signal is given from the drive mechanism 13 upon completion of the automatic positioning, by the drive mechanism 13, of the knob 11, a scale change control section 16 applies a predetermined change scale characteristic to perform control to change the value of the control data, generated by the conversion section 15, in accordance with the predetermined change scale characteristic. The following describe a basic principle or concept of the change scale characteristic implemented by the scale change control section 16 with reference to FIG. 3. FIG. 3 is a flow chart showing a basic concept of the control performed by the scale change control section 16; note, however, that the function of the scale change control section 16 may be implemented either by such a computer program shown in FIG. 3 or by dedicated control circuitry designed to realize the equivalent function.

FIGS. 2A and 2B show examples of the predetermined scale characteristic of the conversion section 15 and the change scale characteristic, where the horizontal axis represents the position data output from the position detector 12 and the vertical axis represents the control data generated by the conversion section 15 in correspondence with the position data. More specifically, in the illustrated examples of FIGS. 2A and 2B, the predetermined scale characteristic of the conversion section 15 is a linear characteristic, which is the simplest form of the predetermined scale characteristic, as indicated by a dotted line. In the figure, Pt indicates a position corresponding to target position data, and Pr indicates a position (stopped position) where the knob 11 has been actually positioned in correspondence with the target position data. Further, in the illustrated examples of FIGS. 2A and 2B, there is an error of −ϵ or +ϵ between Pt and Pr; more specifically, FIG. 2A shows the example where there is an error of −ϵ, while FIG. 2B shows the example where there is an error of +ϵ. The change scale characteristic has first and second change portions set on both sides of a start point, and the change scale characteristic is set to output, at the start point, control data Dt, corresponding to the target position Pt of the predetermined scale characteristic, in correspondence with the position data Pr. Note that the first change portion is a portion including the target position Pt and the second change portion is a portion set on an opposite side from the first change portion.

The scale change control shown in FIG. 3 is started up when the electric fader 10 has been placed in a mode for being automatically positioned to a target position. In the scale change control, the scale change control section 16 acquires the target position data Pt at step S1, and a check is made, at step S2, as to see whether positioning, to the target position, of the electric fader 10 has been completed. If answered in the affirmative, the scale change control section 16 acquires the position data Pr output from the position detector 12 at the time of completion of the positioning, at step S3.

At step S4, the start point and the first change portion are set on the basis of the acquired position data Pt and Pr and the start point. The start point is a position of the position data Pr output from the position detector 12 at the time of completion of the positioning; in other words, the start point is a position at which the knob 11 starts to be moved for the first time after the completion of the positioning. As noted above, the start point is set in such a manner that control data Dt, corresponding to the target position Pt of the predetermined scale characteristic, is output by the conversion section 15 in correspondence with the position data Pr. In this way, even when the actual position (i.e., actually stopped position) Pr is slightly deviated from the target position Pt, control data corresponding to the target position Pt can be generated as data to be output when the knob 11 starts to be moved.

The first change portion is set to include a portion extending from the position of the start point (Pr) at least up to the target position (Pt). In the illustrated example of FIG. 2A, an end point 1E of the first change portion is set at a position remoter from the target position Pt as viewed from the start point. For example, a distance from the start point to the end point 1E may be fixedly set to a value corresponding to a maximum positioning error (e.g., the above-mentioned positioning precision ±0.5 mm) of the drive mechanism 13. Alternatively, because the target and actually stopped positions Pt and Pr can be known each time the control for positioning to the target position is performed, a distance from the start point to the end point 1E may be variably set, with relationship between the positions Pt and Pr taken into account, each time the positioning control is performed.

In the first change portion, a first change scale is determined (calculated) such that the control data output from the conversion section 15 in correspondence with the position data output from the position detector 12 gradually varies from control data (Dt), corresponding to the start point, to control data (D1e), corresponding to the end point 1E of the first change portion, of the predetermined scale characteristic, and the conversion section 15 is instructed to convert the detected position data in accordance with the first change scale, at step S6. In the illustrated example of FIG. 2A, a one-dot-dash line extending from the start point to the end point 1E of the first change portion indicates a characteristic of the first change scale. Needless to say, the characteristic of the first change scale may be any suitable characteristic, rather than being limited to the illustrated linear characteristic, as long as it can achieve a smooth change. By the first change scale being set in this way, the end point 1E of the first change portion is set at a position beyond the target position Pt. Thus, as the knob 11 having previously been stopped at the position Pr deviated from the target position Pt is moved toward the target position Pt, control data, causing no odd feeling, can be generated without the control data, having at the start point a value Dt corresponding to the target position, running counter to a human operator's intention (e.g., changing to decrease in value although the human operator has performed operation for increasing the value) at all (even temporarily). Also, the aforementioned arrangement can achieve a smooth shift from the change scale characteristic to the predetermined scale characteristic.

The purpose for preventing the control data, having at the start point a value Dt corresponding to the target position, from running counter to a human operator's intention even temporarily can also be accomplished by setting the end point 1E of the first change portion to the target position Pt as indicated at 1E' of FIG. 2A. However, in this case, the first change scale characteristic is made flat maintaining the value Dt corresponding to the target position.

At step S5, the second change portion is set on an opposite side from the first change portion with the start point located between the change portions. Appropriate position located on an opposite side from the target position (Pt) as viewed from the start point (Pr) is set as an end point 2E of the second change portion, so that the second change portion extends from the start point to the end point 2E. The end point of the second change portion may be set as desired because the control data, having at the start point a value Dt corresponding to the target position, is prevented from running counter to a human operator's intention (e.g., changing to temporarily increase in value although the human operator has performed operation for decreasing the value) when the knob 11 is moved from the start point to the second change portion. For example, the same position 2E' as the start point may be set as the end point of the second change portion. Setting the same position 2E' as the start point as the end point of the second change portion like this is practically equivalent to setting no second change portion. Namely, in such a case, as the knob 11 is moved from the start point to the second change portion, the change scale characteristic immediately shifts to the predetermined scale characteristic. However, with a view to permitting a smooth shift from the change scale characteristic to the predetermined scale characteristic, it is preferable that the second change portion have a certain length like the first change portion does. For example, a distance from the start point to the end point 2E may be fixedly set to a value corresponding to the maximum positioning error (e.g., the above-mentioned positioning precision ±0.5 mm) of the drive mechanism 13.

In the second change portion, a second change scale is determined (calculated) such that the control data output from the conversion section 15 in correspondence with the position data output from the position detector 12 gradually varies from control data (Dt), corresponding to the start point, to control data (D1e), corresponding to the end point 2E of the second change portion, of the predetermined scale characteristic, and the conversion section 15 is instructed to convert the detected position data in accordance with the second change scale, at step S6. In the illustrated example of FIG. 2A, a one-dot-dash line extending from the start point to the end point 2E of the second change portion indicates a characteristic of the second change scale. Needless to say, the characteristic of the second change scale may be any suitable characteristic, rather than being limited to the illustrated linear characteristic, as long as it can achieve a smooth change. By the second change scale being set in this way, it is possible to achieve a smooth shift from the change scale characteristic to the predetermined scale characteristic. Where the same position as the start point may be set as the end point of the second change portion as indicated at 2E' of FIG. 2A, the second change scale characteristic is made vertical as indicated by a solid line, which is practically equivalent to setting no second change portion.

Note that the foregoing description made in relation to FIG. 2A can also apply directly to a case where the actual position Pr positioned relative to the target position Pt has an error of +ϵ as shown in FIG. 2B.

The scale change control section 16 is constantly monitoring the position data output from the position detector 12, and, once the current position of the knob (operation member) 11 gets off the first or second change portion, the scale change control section 16 instructs the conversion section 15 to cancel the application of the change scale characteristic, at step S7. Thus, the change scale control by the scale change control section 16 is brought to an end, and the conversion section 15 generates control data in accordance with the predetermined scale characteristic.

In this way, the control data generated in accordance with the predetermined scale characteristic and change scale characteristic in response to automatic and manual operation are used appropriately in accordance with the intended purpose or use of the electric fader 10.

Figure 4:
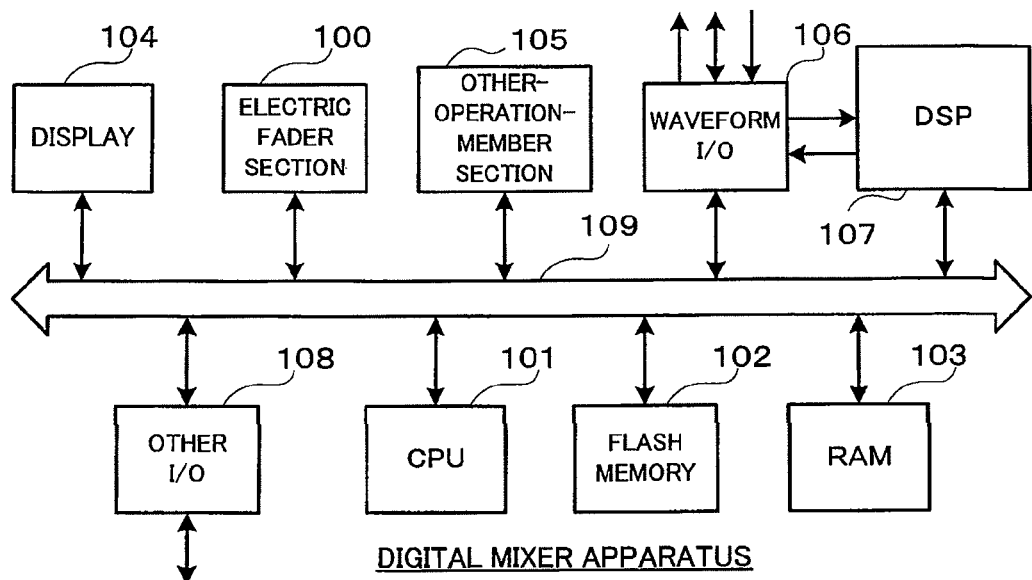
FIG. 4 is a block diagram schematically showing an exemplary electric/electronic setup of a digital mixer apparatus provided with a plurality of the electric faders constructed in a manner shown in FIG. 1.

The following paragraphs describe an embodiment where the aforementioned fader 10 is provided in a digital mixer apparatus for mixing audio or video signals, with reference to FIG. 4 and other figures of subsequent figure numbers.

FIG. 4 is a block diagram schematically showing an exemplary electric/electronic setup of the digital mixer apparatus provided with a plurality of the electric faders 10 constructed in the manner described above in relation to FIGS. 1 to 3. This digital mixer apparatus comprises: an electric fader section 100 including a plurality of the electric faders 10; a central processing unit (CPU) 101; a flash memory 102; a RAM (a Random Access Memory) 103; a display 104; an other-operation-member section 105; a waveform input/output interface (I/O) 106; a digital signal processing device (DSP) 107; another input/output interface (I/O) 108; and a system bus 109.

The CPU 101 controls behavior of the entire digital mixer apparatus. The flash memory 102 is a non-volatile memory having stored therein various programs to be executed by the CPU 101, data to be used by the CPU 101, etc. The RAM 103 is a volatile memory used as a loading area of a program to be executed by the CPU 101, a working area of the CPU 101, etc. The display 104 is provided on a console panel surface of the mixer apparatus for displaying various information. The other-operation-member section 105 includes various operation members (switches, various adjusting operation members, etc.) provided on the console panel surface and operable by the user. The waveform input/output interface 106 is an interface for the mixer apparatus to communicate waveform signals (audio and/or video signals) with an external device, such as a microphone or speaker. For example, waveform signals (audio or video signals) input via the waveform input/output interface 106 are subjected to a mixing process by the mixer apparatus, and the resultant mixed signal is output to an external speaker or the like via the waveform input/output interface 106. The DSP 107 performs the mixing process, effect impartment process, tone volume level control process, etc. on waveform signals input via the waveform input/output interface 106, by executing various microprograms on the basis of instructions given from the CPU 101. The other input/output interface 108 is an interface for connecting other equipment to the mixer apparatus.

The electric faders 10 of the electric fader section 100 are provided, at a plurality of predetermined positions on the console panel surface of the mixer apparatus, to set values of various parameters corresponding to the specifications and purpose of the electric faders 10. Namely, the above-mentioned predetermined scale characteristic of the conversion section 15 is set in such a manner that values of various types of parameters corresponding to the specifications and purpose are generated, as control data from the electric faders 10, in correspondence with operating positions of the knobs 11. In the illustrated example, the functions of the conversion section 15 and scale change control section 16 of each of the electric faders 10 are implemented by processing of a computer program in the CPU 101. The position detector 12 and the drive mechanism 13 are provided individually for each of the electric faders 10. The motor control section 14 may be provided individually for each of the electric faders 10, or common motor control circuit hardware may be shared among the electric faders 10.

Figure 5:
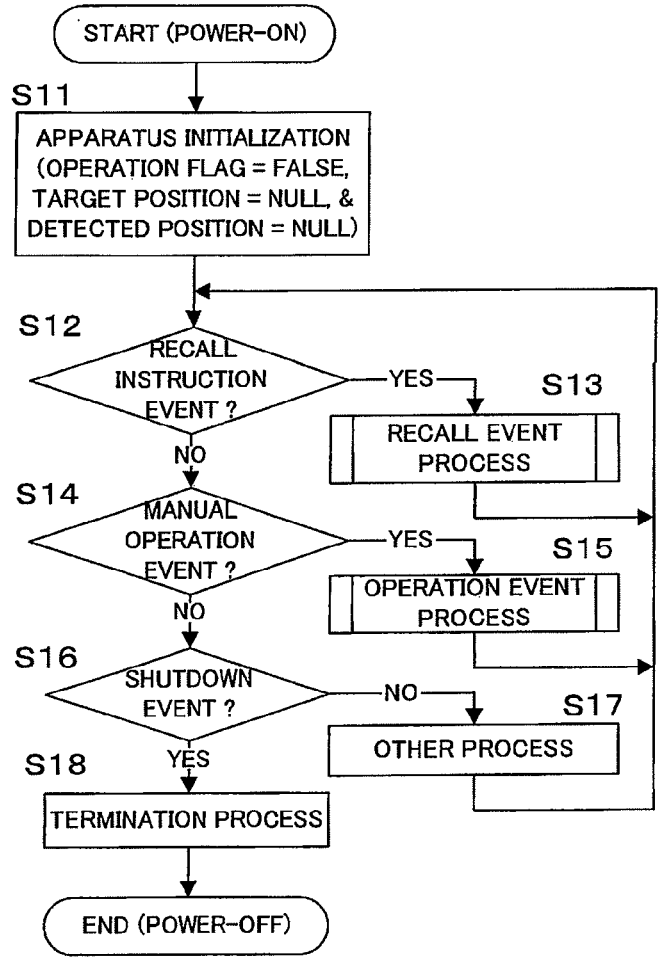
FIG. 5 is a flow chart of an example main routine performed by a CPU of FIG. 4.

FIG. 5 is a flow chart of an example main routine performed by the CPU 101, which shows only portions relevant to the present invention. Upon powering-on, a predetermined program is started up, and, first of all, a predetermined apparatus initialization process is performed at step S11. In the initialization process, an operation flag of the "scale change control", target position register and detected position register are initialized to "FALSE" (0), "Null" (0) and "Null" (0), respectively. The operation flag of the "scale change control" is a flag indicating whether or not the mixer apparatus is to be placed in a mode for applying the change scale characteristic under control of the scale change control section 16. In an initial state, the operation flag of the scale change control is "FALSE" indicating that the change scale characteristic is not to be applied. The target position register is a register provided to store data for setting a target position (corresponding to the position Pt in FIG. 2) when the electric fader 10 is to be automatically operated. The detected position register is a register provided to store data indicative of a position (corresponding to the position Pr in FIG. 2) where the electric fader 10 has been actually stopped relative to a target position upon completion of automatic positioning of the electric fader 10. These operation flag and registers are provided for each of the electric faders 10.

Figure 6:
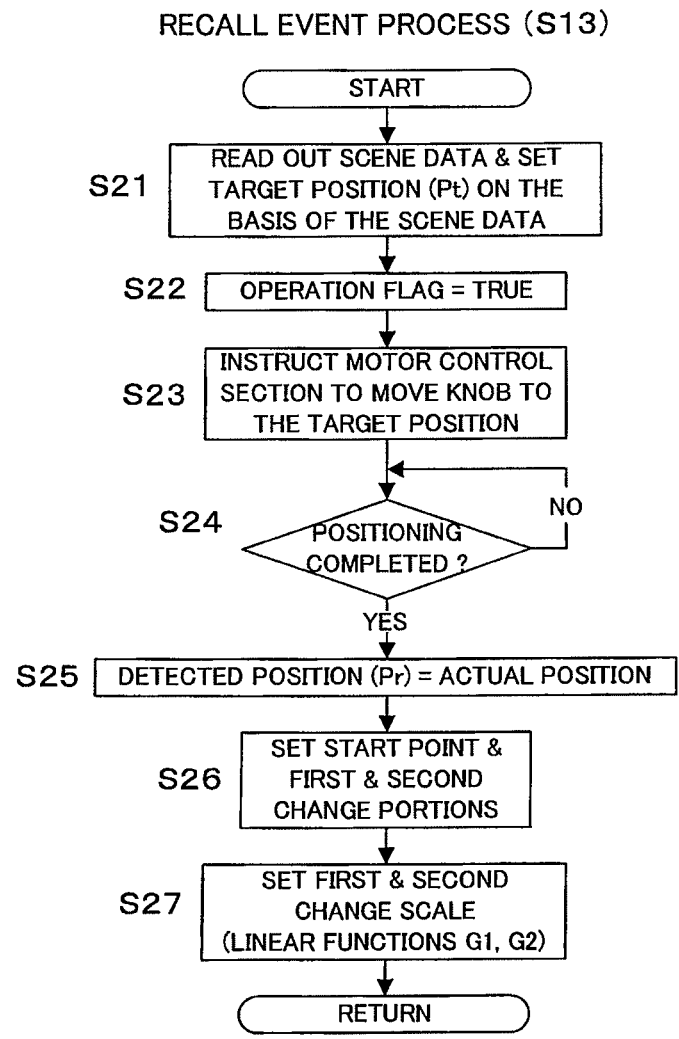
FIG. 6 is a flow chart showing an example of a recall event process shown in FIG. 5.

At step S12, a determination is made as to whether there has occurred a recall instruction event. The recall instruction event is an ON operation event of a scene recall switch (included in the other-operation-member section 105) for recalling a desired scene, which is known as a scene recall function of the mixer. The scene recall function is a function that prestores, into a non-volatile readable/writable memory like the flash memory 102, a plurality of scenes each comprising a set of values of various parameters indicative of desired settings/adjusted states of the electric faders 10, switches and other operation members, reads out any one of the prestored scenes in response to user's selection and sets the read-out parameter values in the corresponding electric faders 10, switches and other operation members. If there has occurred a recall instruction event as determined at step S12, the CPU 101 performs a recall event process subroutine at step S13. One example of the recall event process is shown in FIG. 6.

Figure 7:
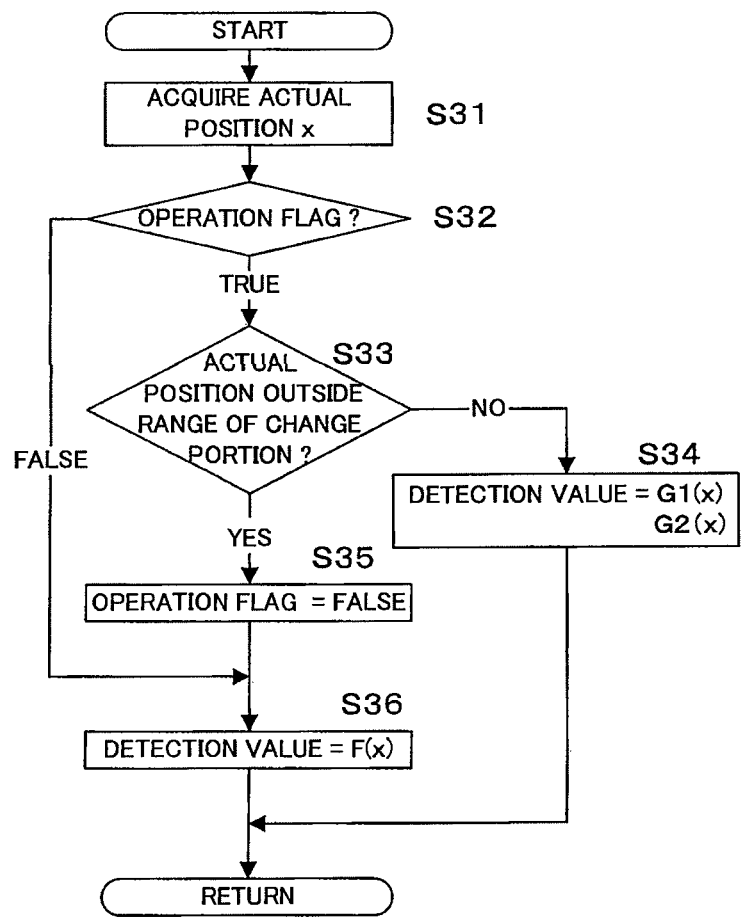
FIG. 7 is a flow chart showing an example of a recall event process shown in FIG. 5.

At step S14, a determination is made as to whether there has occurred a manual operation event of any one of the electric faders 10. If answered in the affirmative at step S14, the CPU 101 performs an operation event process subroutine at step S15, an example of which is shown in FIG. 7. Specifically, the manual operation event is a variation event of the position data output from the position detector 12 of the electric fader 10. For example, if the position detecting precision of the position detector 12 is 0.1 mm, a manual operation event occurs, and thus the operation event process is performed at step S15, each time the knob 11 of the electric fader 10 is moved 0.1 mm.

At step S16, a determination is made as to whether there has occurred a shutdown event (power-off instruction). If answered in the negative, the CPU 101 performs, at step S17, other operations (than a predetermined termination process), such as an operation for storing as scene data a set of various parameters set via the console panel in accordance with a scene memory instruction etc., an operation for updating a displaying state of the display 104 and an operation for controlling the DSP 107. If, on the other hand, there has occurred a shutdown event (power-off instruction) as determined at step S16, the predetermined termination process is performed at step S18. In the termination process, the CPU 101 performs various operations, such as one for turning down an output volume of an output signal, which are to be performed prior to turning-off of the power supply. After that, the program is brought to an end, and the power supply is turned off.

Figure 8:
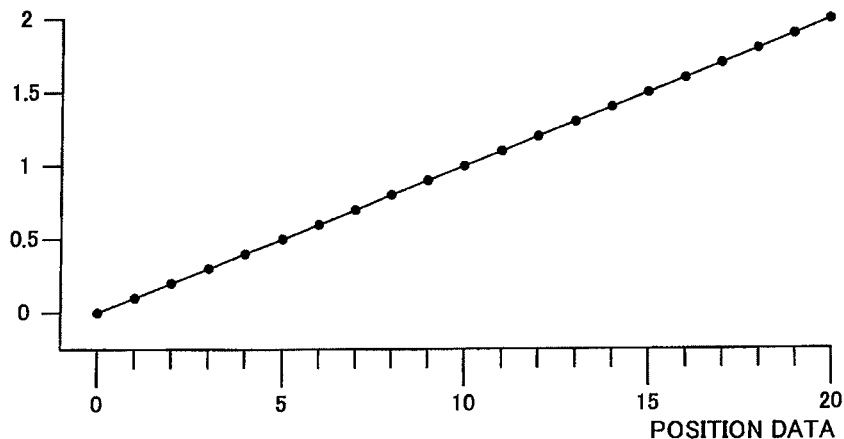
FIG. 8 is a graph showing a specific example of a predetermined scale characteristic.

FIG. 8 shows a specific example of the predetermined scale characteristic employed in the instant embodiment, where the horizontal axis represents the position data output from the position detector 12 while the vertical axis represents the control data generated by the conversion section 15 in correspondence with the position data. In the illustrated example, the predetermined scale characteristic is intended to convert the position data output from the position detector 12 into the control data having a value corresponding linearly to an actual position of the electric fader 10. Namely, in this case, the value of the control data corresponds linearly to the actual position of the electric fader 10 and is practically equivalent to position information of the electric fader 10. However, whereas the position data output from the position detector 12 is limited to a predetermined resolution because of the position detecting precision of the position detector 12, the control data (position information) to be output from the conversion section 15 can be generated as data of a finer or higher resolution than the position detecting precision of the position detector 12, depending on a construction of a conversion table or conversion function. Thus, the predetermined scale characteristic permits fine data conversion.

In the illustrated example of FIG. 8, the position detector 12 is arranged to output digital position data with a 0.1 mm resolution in accordance with an operating position of the knob 11 of the position detector 12. Namely, the position detector 12 outputs digital position data increasing in value by one point in response to each 0.1 mm positional variation of the knob 11 of the position detector 12. Although graduations of only up to 20 points are indicated on the horizontal axis in the illustrated example for convenience sake, the position detector 12 outputs position data having a particular number of points that corresponds to the maximum movement range of the knob 11 set based on a desired design choice. Then, the conversion section 15 outputs, as fader position detection information (control data) in a range of 0.0 mm to N mm; here, 0 mm is a minimum value representing a position where the knob 11 of the fader 10 is located at its lowermost position (or reference position), while N mm is a maximum value representing a position where the knob 11 is located at its uppermost position. Although graduation of only up to 2 mm are indicated on the vertical axis in the illustrated example for convenience sake, the conversion section 15 outputs fader position detection information (control data) up to N mm (maximum value) corresponding to the maximum movement range of the knob 11 set based on a desired design choice. Note that the values of the fader position detection information (control data) output from the conversion section 15 may be of a minimum unit appropriately set based on a desired design choice, such as a minimum unit of the second decimal place (0.001 mm or 10 µm) or minimum unit of the third decimal place (0.001 mm or 1 µm), rather than being limited to the aforementioned minimum unit of the first decimal place (0.1 mm or 100 µm). For example, at least the scale change characteristic may be set to permit data conversion with a fine or high resolution.

The following paragraphs describe an example of the recall event process (step S13 above) with reference to FIG. 6. Once a recall instruction is given, the CPU 101 reads out individual parameter values of a scene (i.e., scene data) to be recalled from the memory and sets a target position (Pt) of each of the electric faders 10, at step S21. In this case, if target position data of the same scale as position data to be output from the position detectors 12 are themselves already stored as scene data in the memory, then the parameter values (i.e., target position data) of the electric faders 10 included in the scene data are themselves set as target position data. If, on the other hand, control data generated by the conversion section 15 in accordance with the predetermined scale characteristic are stored as scene data in the memory, parameter values (i.e., control data) of the electric faders 10 included in the read-out scene data are inversely converted into position data in accordance with the predetermined scale characteristic corresponding to the electric faders 10, and the inversely-converted position data are set as target position data. The thus-set target position data are stored into the target position register. Step S21 above corresponds to step S21 of FIG. 3.

At next step S22, the operation flag of the "scale change control" is set at "TRUE" (value "1"). Then, the CPU 101 gives data indicative of the target position of each of the electric faders 10 to the corresponding motor control section 14 and instructs the motor control section 14 to perform the positioning control for automatically moving the corresponding knob 11 to the target position, at step S23. In accordance with the instruction from the CPU 101, the motor control section 14 automatically moves the knob 11 to the instructed target position. Upon completion of the positioning, the motor control section 14 returns a positioning completion signal to the CPU 101. At step S24, the CPU 101 waits until the positioning completion signal is received. Upon completion of the positioning, the CPU 101 goes to step S25 in order to acquire position data (actual position data) currently output from the position detector 12 and store the acquired position data into the detected position register. The actual position data thus stored into the position detector 12 indicates a position (corresponding to the position Pr of FIG. 2) at which the knob 11 has been actually stopped relative to the target position (Pt), and it may include an error of −ϵ or +ϵ. For example, the maximum error range of −ϵ or +ϵ is assumed to be ±0.5 mm (±5 points if expressed in units of the position data output from the position detector 12). Note that step S24 of FIG. 6 corresponds to step S2 of FIG. 3 and step S25 corresponds to step S3 of FIG. 3.

At step S26, the start point and first and second change portions are set on the basis of the target position (Pt) stored in the target position register and the detected position (actually stopped position Pr) stored in the detected position register in a similar manner to steps S4 and S5 of FIG. 3. Although such a start point and first and second change portions may be set in the same way as described above with reference to FIG. 2, a description will be given below, with reference to FIG. 9, about a more specific example of the way for setting the start point and first and second change portions.

Figure 9:
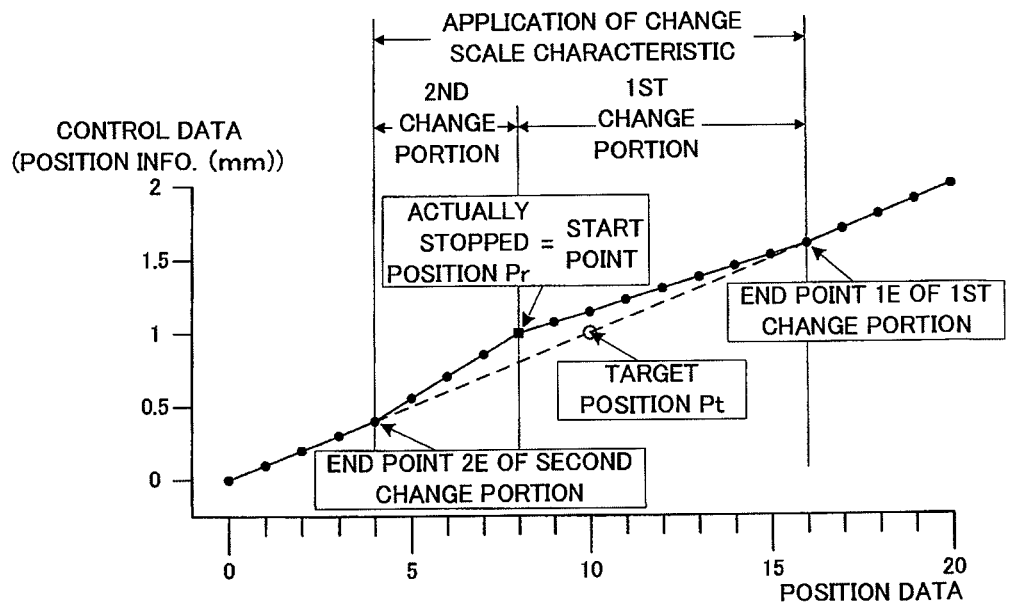
FIG. 9 is a graph showing an example of the change scale characteristic to be used with the predetermined scale characteristic shown in FIG. 8.

FIG. 9 is a diagram showing an example of the change scale characteristic to be used with the predetermined scale characteristic shown in FIG. 8. In the illustrated example of FIG. 9, the start points of the first and second change portions are set such that fader position detection information (control data) corresponding to the target position Pt is set in correspondence with the detected position (actually stopped position Pr). In the illustrated example of FIG. 9, the end point 1E of the first change portion is set at a position of "predetermined distance +D" on the basis of the target position Pt. Here, "D" is set to satisfy D>E, where "E" represents the maximum error range (e.g., ±5 points as expressed in units of the position data) of the positioning error (−ϵ or +ϵ). Although "D" may be equal to the maximum error range E (D=E), it is preferable that "D" be greater than the maximum error range E (D>E). The end point 2E of the second change portion is set at a position of "predetermined distance −D", namely, $$1E=Pt+D, \text{ and}$$

$$2E=Pt-D$$

Thus, the target position Pt is always in a portion where the change scale characteristic is applied, so that the control data can be prevented from running counter to a human operator's intention. Further, by securing appropriate lengths of the first and second change portions, the instant embodiment permits a smooth shift from the change scale characteristic to the predetermined scale characteristic.

At next step S27, the CPU 101 sets first and second change scales, corresponding to the first and second change portions, with a linear function and instructs the conversion section 15 to convert the position data to fader position detection information (control data) in accordance with the thus-set first and second change scales, in a similar manner to step S6 of FIG. 3. Note that, in the instant embodiment, the function of the conversion section 15 is implemented by the operation event process (S15) shown in FIG. 7. For example, a slope $A_1$ of the first change scale corresponding to the first change portion and a slope $A_2$ of the second change scale corresponding to the second change portion are calculated using the following equations:

$$A_1=A*D/(1E-Pr)$$

$$A_2=A*D/(Pr-2E)$$

where "A" represents a slope of a function F(x) of the predetermined scale characteristic. Note that, in the equations, "*" is a multiplication sign and "/" is a division sign.

If the position data output from the position detector 12 is indicated by "x" and an initial value is indicated by "B", then the linear function F(x) of the predetermined scale characteristic can be expressed by $$F(x)=Ax+B$$

Function $G_1$ representing the first change scale corresponding to the first change portion can be expressed by $$G_1(x)=A_1x+(A-A_1)\,1E+B,$$

where the position data x is a value within the range of the first change portion.

Function $G_2$ representing the second change scale corresponding to the second change portion can be expressed by $$G_2(x)=A_1x+(A-A_2)\,2E+B,$$

where the position data x is a value within the range of the second change portion.

In the illustrated example of FIG. 9, where D=6 and B=0

$$F(x)=(1/10)\,x+0$$

$$A_1=(1/10)*6/(16-8)=3/40$$

$$A_2=(1/10)*6/(8-4)=3/20$$

$$G_1(x)=3/40x+(2/5)$$

$$G_2(x)=3/20x-(1/5)$$

Note that the operations of steps S24-S27 of FIG. 6 are performed for each of the faders 10.

The following describe an example of the operation event process (S15) with reference to FIG. 7. First, the operation event process will be described in relation to a case where the electric fader 10 has been operated manually for the first time. In this case, the operation flag of the "scale change control" is currently set at "TRUE" (step S22 of FIG. 6) indicating that the mixer apparatus is in the mode for applying the change scale characteristic. At step S31, the CPU 101 acquires current position data (actual position x) from the position detector 12. The CPP 101 checks the operation flag at step S32 and then goes to step S33 because the operation flag is currently set at "TRUE". At step S33, a determination is made as to whether the acquired actual position x is outside the range of the first or second change portion. If the acquired actual position x is within the range of the first or second change portion, the CPU 101 branches to step S34 in order to generate fader position detection information (control data) in accordance with the function $G_1$ or $G_2$ representing the first or second change scale. More specifically, if the acquired actual position x is within the range of the first change portion, the CPU 101 generates fader position detection information (control data) in accordance with the function $G_1(x)$ representing the first change scale corresponding to the first change portion, and if the acquired actual position x is within the range of the second change portion, the CPU 101 generates fader position detection information (control data) in accordance with the function $G_2(x)$ representing the second change scale corresponding to the second change portion. After that, each time an operation event of the electric fader 10 occurs, the CPU 101 performs operations of steps S31, S32, S33 and S34 to generate fader position detection information (control data) in accordance with the function $G_1(x)$ or $G_2(x)$ representing the first or second change scale.

Then, once the operating position of the electric fader 10 gets out of the range of the first or second change portion, the CPU 101 makes a YES determination at step S33, so that the operation flag is reset to "FALSE" at step S35. In this way, the mode for applying the change scale characteristic is canceled. At next step S36, fader position detection information (control data) corresponding to an actual position x is generated in accordance with the normal function F(x) representing the predetermined scale characteristic. After that, the operation flag is determined to be "FALSE" at step S32, so that operations of steps S31, S32 and S36 are performed. Thus, after that, each time an operation event of the electric fader 10 occurs, the CPU 101 generates fader position detection information (control data) in accordance with the normal function F(x) representing the predetermined scale characteristic.

Further, in the illustrated example of FIG. 9, a position of 10 points (1 mm) is designated as the target position Pt, and the knob 11 of the fader 10 has actually stopped at a position Pr of 8 points (0.8 mm) as a result of the automatic positioning. Namely, a deviation of the actually stopped position Pr from the target position Pt is 2 points (0.2 mm) that is within the predetermined maximum error range of ±E=±0.5 mm (±5 points). If the fader has been manually moved in an increasing direction after that, the function $G_1(x)$ representing the first change scale corresponding to the first change portion is applied so that fader position detection information (control data) indicative of 1.0 mm corresponding to the target position Pt (10 points) of the predetermined scale characteristic is generated in accordance with the function $G_1(x)$, although the actual position x corresponding to the start point is the position Pr (8 points). After that, in the first change portion, fader position detection information (control data) indicative of 1.0 mm-1.6 mm is generated in accordance with the function $G_1(x)$ representing the first change scale in response to variation of the actual position x from 8 points to 16 points. Then, once the knob 11 gets out of the first change portion past the end point 1E=16 points, fader position detection information (control data) is generated in accordance with the function F(x) representing the predetermined scale characteristic. In this case, if the number of significant figures after the decimal point is increased to permit generation of fader position detection information (control data) with a finer or higher resolution, it is possible to achieve smooth variation as shown. If, on the other hand, the significant figure after the decimal point is only in the first decimal place, the fader position detection information (control data) generated does not necessarily present smooth variation and presents rather stepwise variation; however, even such stepwise variation is also permissible.

If, on the other hand, the fader has been manually moved in a decreasing direction, the function $G_2(x)$ representing the second change scale corresponding to the second change portion is applied so that fader position detection information (control data) of 1.0 mm-0.4 mm is generated, in response to variation, from 8 points to 4 points, of the actual position x, in accordance with the function $G_2(x)$. Then, once the knob 11 gets out of the second change portion past the end point 2E=4 points, fader position detection information (control data) is generated in accordance with the function F(x) representing the predetermined scale characteristic.

Of course, the application of the change scale characteristic is canceled once the knob 11 gets out of the first or second change portion; thus, after that, fader position detection information (control data) will be generated in accordance with the function F(x) representing the predetermined scale characteristic even when the knob 11 is moved back to the portion that was previously the first or second portion.

Figure 10:
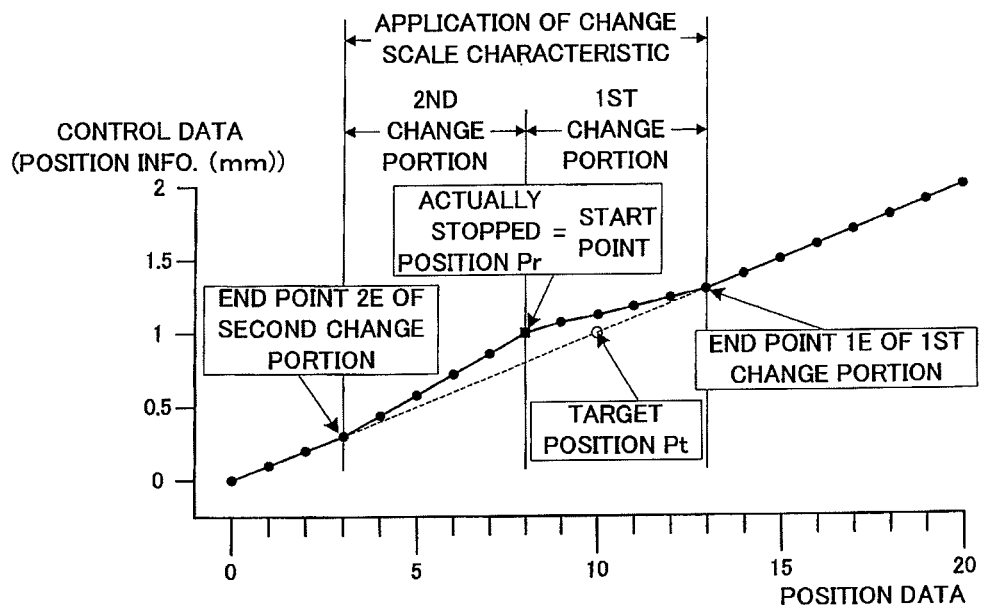
FIG. 10 is a diagram showing another example of the change scale characteristic to be used with the predetermined scale characteristic shown in FIG. 8.

FIG. 10 is a diagram showing another example of the change scale characteristic to be used with the predetermined scale characteristic shown in FIG. 8. The illustrated example of FIG. 10 is different from the example of FIG. 9 in terms of the way for setting the end points 1E and 2E of the first and second change portions. In the illustrated example of FIG. 10, the end point 1E of the first change portion is set at a position of "predetermined distance +D" on the basis of the actually stopped position Pr relative to the target position, while the end point 2E of the second change portion is set at a position of "predetermined distance −D" on the basis of the actually stopped position Pr relative to the target position. Here, "D" is set to satisfy D=E, where "E" represents the maximum error range (e.g., ±5 points expressed in units of the position data) of the positioning error (−ϵ or +ϵ). "D" may be greater than E (D>E); it is rather preferable that "D" be greater than the maximum error range E, in order to permit a smooth shift from the change scale characteristic to the predetermined scale characteristic. If D=E, the slope of the change scale of one of the first and second change portions undesirably becomes flat, but, such a flat slope of the change scale can be avoided if D>E.

In a case where the start point is located near any one of opposite end portions of the predetermined movement range of the fader 10, the end point 1E or 2E of one of the first and second change portions (located adjacent to the one end) can not be set properly, so that it is not possible to set an appropriate change scale for that one change portion. In order to avoid such an inconvenience, the following two measures may be taken.

Figure 11:
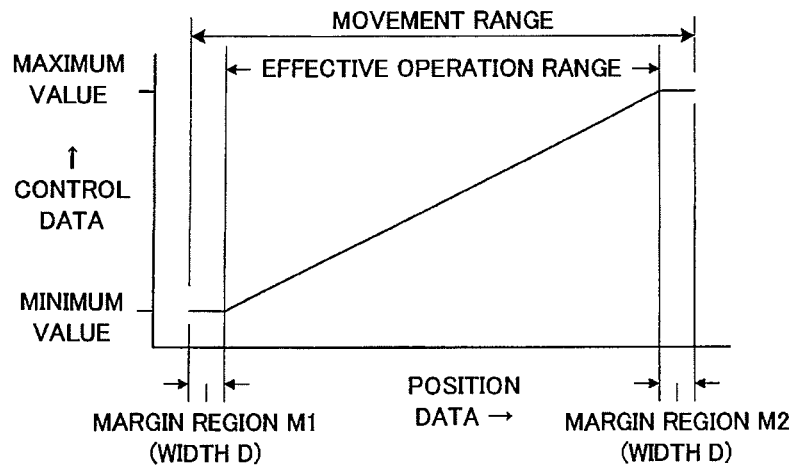
FIG. 11 is a graph showing an example where margin regions of the predetermined scale characteristic are set in predetermined ranges of opposite end portions of a maximum movement range of the fader.

One of the two measures is to set, in the predetermined scale characteristic set by the conversion section 15, margin regions M1 and M2 for maintaining minimum and maximum values of the control data (vertical axis) responsive to variation of the position data (horizontal axis) in predetermined ranges D set in opposite end portions of the maximum movement range of the fader 10, as shown in FIG. 11. In this case, although the fader 10 can be entered into and moved within the margin regions M1 and M2, an effective operation range where valid control data can be obtained is inside the margin regions M1 and M2. The predetermined ranges (or widths) D of the margin regions M1 and M2 are set to at least equal the maximum range E of the positioning error (−ϵ to +ϵ) (i.e., D=E). Namely, according to this measure, when the target position (Pt) is at its minimum or maximum value, the stopped position (Pr) positioned with the greatest positioning error (−ϵ for the margin region M1 or +ϵ for the margin region M2) is located in the margin region M1 or M2.

Then, where the start point of the first change portion is located in the margin region M1 or M2, the scale change control section 16 generates control data according to the first change scale only for the first change portion. Thus, in the case where the start point of the first change portion is located in the margin region M1 or M2, the entire predetermined scale characteristic corresponding to the second change portion located opposite from the target position (Pt) will be located in the margin regions M1 and M2. Therefore, it is only necessary to maintain a given minimum value or maximum value (namely, it is not necessary to generate valid data). Thus, even where the end point 2E of the second change portion could not be set properly, an appropriate change scale can be set because it is only necessary to maintain a given minimum value or maximum value, or there is no need to generate valid data for that portion.

Figure 12:
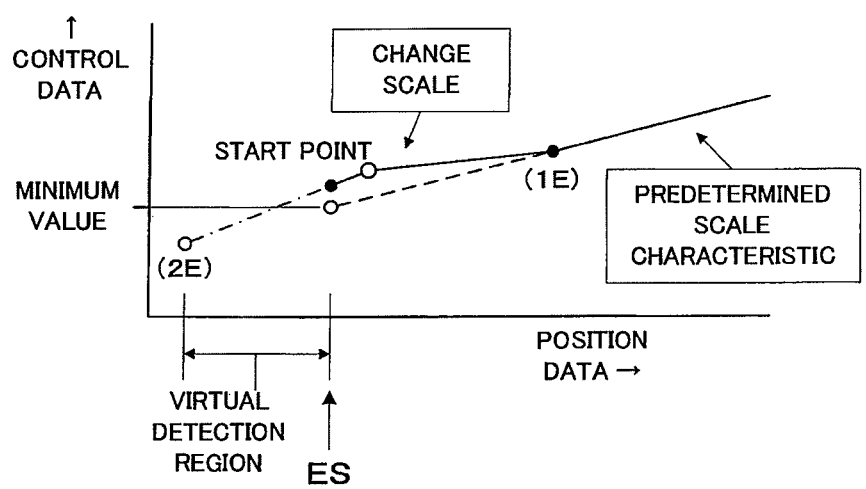
FIG. 12 is a graph showing an example where virtual position detection regions are set in the opposite end portions of the movement range of the fader so as to extend beyond the opposite ends.

The other of the two measures is, as shown in FIG. 12, to set a virtual position detection region at each of opposite end portions (only one of the end portions ES is shown in enlarged scale) of the movement range of the electric fader 10 to extend beyond the end portion (ES) and also set the second change portion in each of the end portions (ES) to extend over the virtual position detection region. The virtual position detection region is a region for allowing fader position detection information (control data) according to the predetermined scale characteristic to be virtually generated, assuming that position data (x) are generated although position data (x) corresponding to that region are not actually generated because the virtual position detection region is outside the movement range. Setting such a virtual position detection region can set the end point 2E of the second change portion and thus can set/calculate the function $G_2$ representing the second change scale.

In the case where the predetermined scale characteristic of the conversion section 15 is of a linear function as shown in FIG. 8, and if data (parameter) presenting a non-linear function characteristic, such as a decibel characteristic, relative to an amount of the fader 10 is to be obtained as final control data (parameter), it is only necessary to further convert fader position detection information (control data), output from the conversion section 15, by means of another conversion section of a desired non-linear conversion characteristic. Of course, the instant embodiment is not so limited, and the predetermined scale characteristic of the conversion section 15 may itself be a desired non-linear conversion characteristic, in which case fader position detection information (control data) generated by the conversion section 15 may be expressed directly in data of a predetermined scale characteristic, such as decibel (attenuation amount) data.

The operation member to which the basic principles of the present invention are applicable is not limited to the above-described fader (sliding or linearly moving operation member) and may be a rotary-type operation member or an operation member of any other type as long as it is constructed to be capable of both manual operation and automatic operation.

The position data output from the position detector 12 and the fader position detection information output from the conversion section 15 in accordance with the position data may be associated with each other either successively or non-successively or stepwise, irrespective of whether the predetermined scale characteristic is linear or non-linear.

The control data generation device (electric fader 10) of the present invention is applicable not only to mixer apparatus as described above, but also to electronic musical instruments, amusement equipment, electronic toys and various control equipment.

This application is based on, and claims priority to, JP PA 2008-202922 filed on 6 Aug. 2008. The disclosure of the priority application, in its entirety, including the drawings, claims, and the specification thereof, is incorporated herein by reference.

What is claimed is:

1. A control data generation device comprising:
   an operation member operable over a predetermined movement range;
   a position detector section adapted to detect a current operating position of said operation member in the predetermined movement range and to output position data corresponding to the detected current operating position;
   a conversion section adapted to convert position data, outputted by said position detector section, into control data;
   an automatic positioning section adapted to position said operation member to a completion position; and
   a scale change control section adapted to apply a change scale characteristic to conversion in the conversion section,
   wherein the conversion section is adapted to convert position data into control data in accordance with a predetermined scale characteristic or in accordance with the applied change scale characteristic,
   wherein the predetermined scale characteristic corresponds position data indicative of a target position to control data having a target value, and
   wherein the applied change scale characteristics corresponds position data indicative of the completion position into control data having the target value.

2. The control data generation device as claimed in claim 1 wherein, in the predetermined scale characteristic, margin regions are set for maintaining a minimum or maximum value in response to variation of position data within predetermined ranges set in opposite end portions of the predetermined movement range.

3. The control data generation device as claimed in claim 1, wherein the scale change control section is adapted to set a change portion, which includes at least the completion position and the target position, in the predetermined movement range of the operation member, apply the change scale characteristic to the change portion, and cancel application, to the change portion, of the change scale characteristic once a current operating position of said operation member reaches an end point of the change portion.

4. The control data generation device as claimed in claim 3 wherein virtual position detection regions are set in opposite end portions of the predetermined movement range in such a manner that the virtual position detection regions extend beyond respective ones of opposite end portions, and said change portion is set over each of the virtual position detection regions.

5. The control data generation device as claimed in claim 3, wherein the change scale characteristic corresponds position data of the end point of the change portion to control data having an end value, and
   wherein the predetermined scale characteristic corresponds the position data of the end point of the change portion to control data having the end value.

6. The control data generation device as claimed in claim 5, wherein positioning precision of said automatic positioning section is lower than position detecting precision of said position detector section so that positioning, to the completion position, of said operation member is performed within a predetermined error range about a target position relative to the position detecting precision of said position detector section.

7. The control data generation device as claimed in claim 6 wherein the change portion is set in correspondence with the error range.

8. A computer-implemented method for generating control data in accordance with an operating position of an operation member operable over a predetermined movement range, comprising:
   a position detection step of detecting, by means of a position detector, a current operating position of the operation member in the predetermined movement range and acquiring, from the position detector, position data corresponding to the detected current operating position;
   a conversion step of converting position data, acquired by said position detection step, into control data;
   an automatic positioning step of positioning said operation member to a completion position; and
   a scale change control step of applying a change scale characteristic to conversion in the conversion step,
   a conversion step of converting position data into control data in accordance with a predetermined scale characteristic or in accordance with the applied change scale characteristic,
   wherein the predetermined scale characteristic corresponds position data indicative of a target position to control data having a target value, and
   wherein the applied change scale characteristics corresponds position data indicative of the completion position into control data having the target value.

9. The method claimed in claim 8, wherein the scale change control step sets a change portion, which includes at least the completion position and the target position, in the predetermined movement range of the operation member, applies the change scale characteristic to the change portion, and cancels application, to the change portion, of the change scale characteristic once a current operating position of said operation member reaches an end point of the change portion.

10. The method as claimed in claim 9, wherein the change scale characteristic corresponds position data of the end point of the change portion to control data having an end value, and
    wherein the predetermined scale characteristic corresponds the position data of the end point of the change portion to control data having the end value.

11. A non-transitory computer-readable medium containing a program executable by a computer to cause a control data generation device to perform a method for generating control data in response to operation of an operating device, the operating device comprising: an operation member operable over a predetermined movement range; a position detector section adapted to detect a current operating position of the operation member in the predetermined movement range and to output position data corresponding to the detected current operating position; and an automatic positioning section adapted to position the operation member to a completion position, said method comprising:

a conversion step of converting position data, acquired by the position detector section, into control data;

an instruction step of instructing, to the automatic positioning section, a target position; and a scale change control step of applying a change scale characteristic to conversion in the conversion step, a conversion step of converting position data into control data in accordance with a predetermined scale characteristic or in accordance with the applied change scale characteristic, wherein the predetermined scale characteristic corresponds position data indicative of the target position to control data having a target value, and wherein the applied change scale characteristics corresponds position data indicative of the completion position into control data having the target value.

12. The non-transitory computer-readable medium claimed in claim 11, wherein the scale change control step sets a change portion, which includes at least the completion position and the target position, in the predetermined movement range of the operation member, applies the change scale characteristic to the change portion, and cancels application, to the change portion, of the change scale characteristic once a current operating position of said operation member reaches an end point of the change portion.

13. The non-transitory computer-readable medium as claimed in claim 12, wherein the change scale characteristic corresponds position data of the end point of the change portion to control data having an end value, and wherein the predetermined scale characteristic corresponds the position data of the end point of the change portion to control data having the end value.

* * * * *